Figure 1:
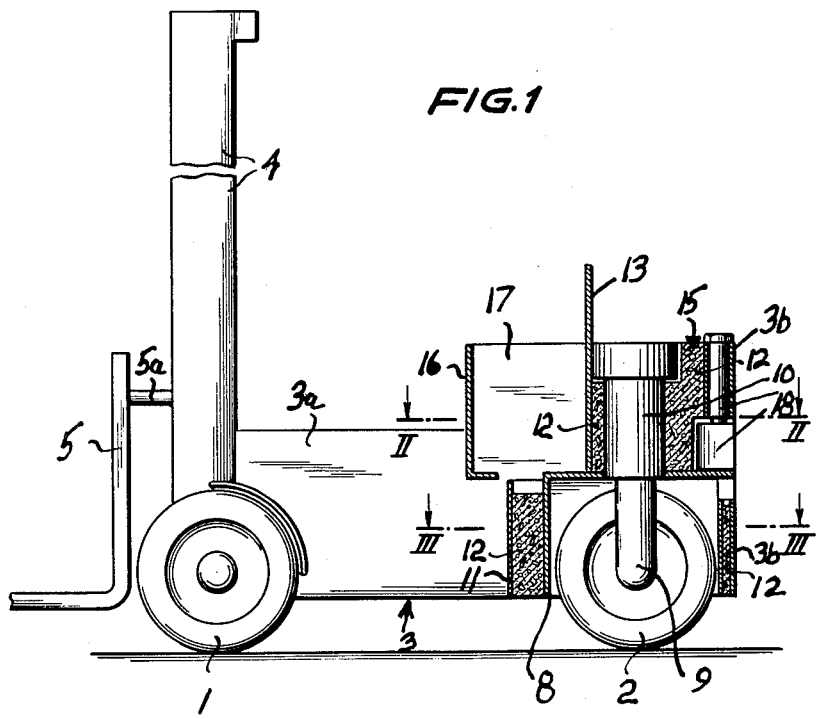

April 10, 1962 J. LOEF 3,029,088
COUNTERWEIGHT FOR THREE WHEEL VEHICLES
Filed Feb. 16, 1959 2 Sheets-Sheet 1

April 10, 1962    J. LOEF    3,029,088
COUNTERWEIGHT FOR THREE WHEEL VEHICLES
Filed Feb. 16, 1959    2 Sheets-Sheet 2
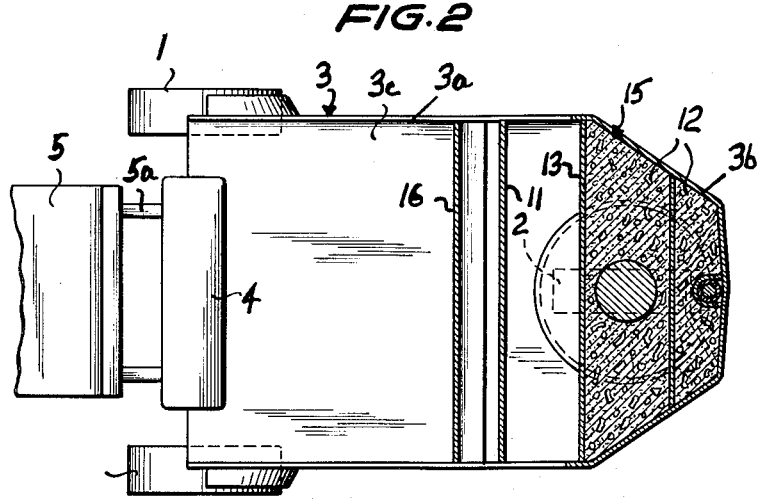
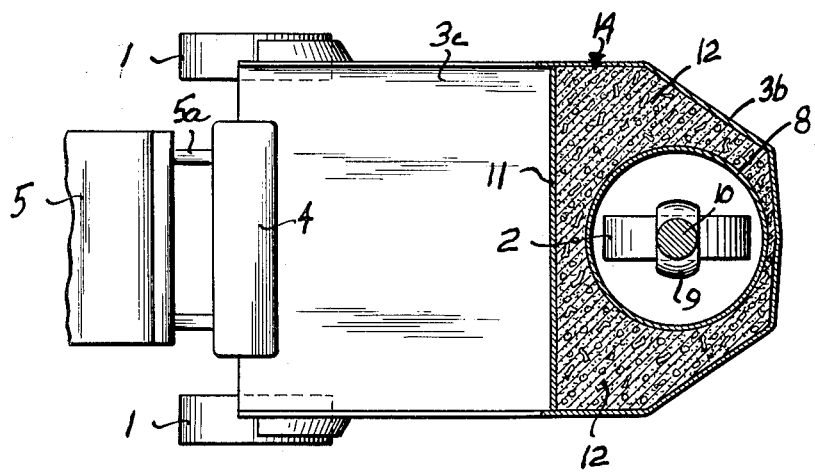

United States Patent Office 3,029,088
Patented Apr. 10, 1962

3,029,088
COUNTERWEIGHT FOR THREE WHEEL VEHICLES
Jakob Loef, Moosburg, Germany, assignor to Firma Steinbock G.m.b.H., Moosburg, Germany
Filed Feb. 16, 1959, Ser. No. 793,309
Claims priority, application Germany Feb. 15, 1958
2 Claims. (Cl. 280—62)

This invention relates to a lifting and conveying vehicle.

Lifting and conveying vehicles with a load-bearing device beyond the wheel-base require a counter-weight that is connected to the frame or chassis at the end opposite the load-bearing device. In normal practice, cast iron blocks are used as counter-weights and they are generally connected to the rear of the chassis.

It is an object of the present invention to provide a vehicle of the character indicated having an improved construction.

In accordance with the invention, the frame-unit of the vehicle is constructed in the form of a welded steel-plate tube-blank, or hollow body, supporting a load-bearing unit at one end having an opposite end filled with a weighting agent or filler, such as a concrete-scrap-iron mixture.

In the accompanying drawings which show an illustrative embodiment of the invention FIG. 1 is a vertical side-elevational view, partly in section, of a vehicle embodying features of the invention;

FIG. 2 is a top plan view of the vehicle shown in FIG. 1 with the rear portion in section as seen approximately along the line II—II in FIG. 1; and FIG. 3 is a similar view of the vehicle with the rear portion seen approximately along the line III—III of FIG. 1.

Referring to the drawings, the vehicle illustrated has as a component part a body or frame unit indicated generally at 3 and defined by welded steel plates defining sides 3a, a rear wall portion 3b and a bottom 3c. Supported by frame 3 are a pair of fixed axle wheels 1, and a rear steering-wheel 2. At the forward end of the frame-unit 3, there is carried the post 4 which supports the load-bearing device 5 by means of arms 5a. Interiorly, the post 4 is provided with any convenient means (not shown) of known type for raising and lowering the device 5. These means may take the form, for example, of pulleys or gears which may be actuated mechanically, as by a motor, or which may be actuated manually, as by means of a lever or crank.

At the rear of the frame unit 3, there is formed a circular housing 8 for the rear steering wheel 2 which is rotatably supported in arms 9 carried by a rotatable shaft 10 extending upwardly to the top of the frame unit. Forwardly of the housing 8 is a transverse partition 11 which defines with the side walls 3a and the rear wall portion 3b a chamber surrounding the housing 8. This chamber is filled with a mixture of concrete and scrap iron 12 which is suitably poured into the chamber while the concrete is fresh and allowed to set and solidify. An upper transverse partition 13 extends between side walls 3a above housing 8 and defines a second chamber at the rear of the frame unit 3 which is also filled with the concrete-scrap-iron mixture. The two above-mentioned chambers are designated generally by the reference numerals 14 and 15, respectively. The shaft 10 is suitably protected from the concrete mass by means of a thin surrounding sleeve or the like. A third partition 16 cooperates with partition 13 to define a compartment 17 which is adapted to receive the operator of the vehicle. The wheel 2 is steered by the operator by means of a steering wheel connected to the frame unit 3. At the rear of the frame unit 3 is seen a coupling 18 which is for the purpose of pulling trailer trains.

The contents of chambers 14 and 15 provide a counter weight for the load-bearing device at the opposite end of the vehicle and while a mixture of scrap iron and concrete is the preferred weighting material, other materials such as coarse sand and lead plates may be used. As will be seen in FIG. 1, the major portion of the weighting material lies forwardly of the rearmost surface of the wheel 2.

It will be understood that various changes and modifications may be made in the embodiment described above and illustrated in the drawings without departing from the invention as defined in the appended claims and it is intended, therefore, that all matter contained in the foregoing description and in the drawings shall be interpreted as illustrative only and not as limitative of the invention.

We claim:

1. A lifting vehicle comprising a body supporting a pair of front wheels and a single steerable rear wheel mounted in a support adapted for pivoting movement about a vertical axis, said body being formed from steel plate, a load-bearing device disposed beyond the wheel base of the vehicle, said load-bearing device being supported by said body at one end thereof and the opposite end of said body being formed to define a plurality of chambers, including a first chamber completely surrounding said steerable rear wheel and extending to the lowermost portion of said body, and a second chamber disposed above said rear wheel and above said first chamber, and weighting means disposed in said first and second chambers to provide a counter weight for said load-bearing device, the major portion of said weighting means being disposed between said front wheels and the rearmost surface of said rear wheel and being wholly confined within said body and at least partially extending to the lowermost portion of said body, whereby said weighting means forms an integral part of said body.

2. A vehicle as defined in claim 1, wherein said weighting means comprises an integral mass of scrap iron and concrete.

References Cited in the file of this patent

UNITED STATES PATENTS

| | | |
|---|---|---|
| 2,299,445 | Weaver | Oct. 20, 1942 |
| 2,337,109 | Johnson | Dec. 21, 1943 |
| 2,381,729 | Dunham | Aug. 7, 1945 |
| 2,440,550 | Martin | Apr. 27, 1948 |
| 2,561,300 | Walker | July 17, 1951 |
| 2,809,756 | Bannister | Oct. 15, 1957 |
| 2,925,149 | Hughson | Feb. 16, 1960 |

FOREIGN PATENTS

| | | |
|---|---|---|
| 271,286 | Switzerland | Jan. 16, 1951 |